(12) United States Patent
Wang (10) Patent No.: US 7,703,643 B2
(45) Date of Patent: Apr. 27, 2010

(54) DEVICE FOR PUMPING VISCOUS MATERIALS, WITHOUT DRIPPING AND METHOD OF THE SAME

(75) Inventor: Feng-Ho Wang, Hsinchu (TW)

(73) Assignee: Jelley Technology Co., Ltd., Hsinchu (TW)

( * ) Notice: Subject to any disclaimer, the term of this patent is extended or adjusted under 35 U.S.C. 154(b) by 844 days.

(21) Appl. No.: 11/527,165

(22) Filed: Sep. 27, 2006

(65) Prior Publication Data

US 2008/0073381 A1    Mar. 27, 2008

(51) Int. Cl.
*B65D 5/72* (2006.01)
(52) U.S. Cl. ............................ 222/571; 222/1; 222/108; 222/113; 222/192; 222/326; 222/333; 222/390
(58) Field of Classification Search ....................... 222/1, 222/333, 108, 113, 191–192, 571, 390, 325–327, 222/386, 391
See application file for complete search history.

(56) References Cited

U.S. PATENT DOCUMENTS

| | | | | |
|---|---|---|---|---|
| 4,923,096 A | * | 5/1990 | Ennis, III | 222/391 |
| 4,953,755 A | * | 9/1990 | Dennison | 222/146.5 |
| 5,035,350 A | * | 7/1991 | Blette et al. | 222/212 |
| 6,089,407 A | * | 7/2000 | Gardos | 222/137 |
| 6,260,737 B1 | * | 7/2001 | Gruendeman | 222/391 |

* cited by examiner

Primary Examiner—Frederick C. Nicolas (57) ABSTRACT

Device for pumping viscous materials, particularly sealant and grease, without dripping and method of the same are characterized by storing a predetermined portion of the driving energy in form of an angular and/or linear displacement of a torsional spring. This very portion of the stored energy will be released at the end of the operation when the operator let go the trigger, whereby the released energy will drive the final transmission and the end part of the final transmission to move backwards for a predetermined amount of displacement. This backwards movement of the end part of the final transmission causes the volume of viscous material to expand suddenly; this expansion of the volume of viscous material compensates the compression of the viscous material from the dispensing process, which will also draw back the viscous material on its way outward for to work and for to drip.

7 Claims, 10 Drawing Sheets

DEVICE FOR PUMPING VISCOUS MATERIALS, WITHOUT DRIPPING AND METHOD OF THE SAME

FIELD OF THE INVENTION

The present invention relates to pumping devices for viscous materials, such as sealant and grease, more particularly to a device for pumping viscous materials without dripping and method of the same. Grease is widely used in automobile industry, military industry, food industry, transportation industry and other heavy-machine industries for lubricating bearing mounts, gear boxes, transmission chains in manufacturing machines. Sealant is widely used to seal automobile wind shields, automobile bodies, coolers, glass windows and even submarine bodies.

BACKGROUND OF THE INVENTION

A sealant gun or grease gun of the prior art is a device activated by fingers pressing a trigger, whereby the disk on the tip of a push rod will be driven forward by leverage to eject a viscous material out of the gun. However, the conventional gun is inconvenient in that the pumping of the viscous material takes manual power and is discontinuous. Therefore, smooth ejection of the material is not possible. Sealant/grease guns powered by compressed air or electricity are invented to assure smooth and continuous ejection of the viscous material and to save manual power. However, there are many other problems, such as the hindrance of air hoses or power cords to the operation. It is a further problem in manual and electricity/compressed air powered sealant/grease guns that the viscous material will continue to drip out of a gun after the pumping stops because of the exertion of elastic force on the disk on the push rod by the deformed viscous material. During the pumping, the viscous material is squeezed so that potential energy is stored therein; and, since the push rod will not go quickly after the pumping stops, the restoring material will exert force on the rod. At the same time, the reaction of the disk on the rod will push a small amount of the material out of the gun, forming the problem of dripping. To prevent dripping, some manual guns are equipped with a release for pulling back push rods in time.

Each of the electric sealant guns disclosed by the patents U.S. Pat. No. 6,123,235 and TW00405447 has a conventional DC motors and a clutch, whereby the resistance against the drawback of push rod will be automatically released after a person stopping pushing the trigger, and whereby the viscous material left in the gun will be able to push the push rod backward. However, the dripping problem cannot be removed completely, because the disk at the end of the push rod still experiences resistant forces caused by the friction between various movable components associated with the clutch. Therefore, the viscous material still has to experience reaction from the disk, and the dripping cannot be fully stopped.

SUMMARY OF THE INVENTION

Accordingly, the primary objective of the present invention is to provide a device for pumping viscous materials, particularly sealant and grease, without dripping and method of the same, having a simple structure for pumping a viscous material smoothly and continuously without manual power. The problem of dripping after the pumping stops will be prevented.

To achieve above object, the present invention provides a method of pumping viscous materials which comprises the steps of: (1) storing a predetermined portion of driving energy for the pumping as elastic potential energy when the pumping starts; and (2) releasing the stored energy when the pumping stops, leaving room for the viscous materials as it expands after a pumping mechanism is terminated, whereby the viscous materials will be sucked back into an associated pumping device for preventing dripping of the viscous materials.

Furthermore the present invention provides a device for pumping viscous materials which comprises a main body further comprising a bracket and a handle; a driving with energy storing/releasing function further comprising an actuator and a module for energy storing/releasing; and a pumping unit further comprising a push rod, a driving screw nut and a piston. A predetermined portion of driving energy will be stored for the pumping as elastic potential energy when the pumping starts, whereby the stored energy will be released when the pumping stops, and whereby the viscous materials will be sucked back into an associated pumping device for preventing dripping of the viscous materials.

The various objects and advantages of the present invention will be more readily understood from the following detailed description when read in conjunction with the appended drawings.

BRIEF DESCRIPTION OF THE DRAWINGS

The various objects and advantages of the present invention will be more readily understood from the following detailed description when read in conjunction with the appended drawings.

DETAILED DESCRIPTION OF THE PREFERRED EMBODIMENTS

The first preferred embodiment of the present invention utilizes a slope and a spring for storing a portion of driving mechanical power as elastic potential energy. Specifically, there is a slope on a driving nut, whereby as the pumping starts the driving torque will firstly overcome the resistant force of the spring and the nut will be pushed by the connected push rod for a longitudinal distance $\Delta l$. The height of the slope h will control the stored elastic potential energy. When the push rod move over Δl, the mechanism of energy storage will be bypassed, and the push rod will be directly driven to move by the external agent. When the pumping stops, that is, the driving torque disappears, the spring of the mechanism of energy storage will restore its initial configuration and at the same time release the stored energy. As the spring restores, the volume of the viscous material will expand, which will suck the viscous material into the gun. Thereby, dripping is prevented. The spring of this preferred embodiment is a compressive torsional spring.

The second preferred embodiment of the present invention utilizes a spring for storing a portion of driving mechanical power as elastic potential energy. Specifically, there is a torsional spring disposed behind a driving nut, whereby as the pumping starts the driving torque will balance the restoring force of the torsional spring, causing a transition of the driving power into potential energy realized by a stretch distance of the spring Δl. The stretch distance Δl of the torsional spring is predetermined by a d value, after which the system will bypass the energy storing mechanism and drive the viscous material directly. When the pumping stops, that is, the driving torque disappears, the spring of the mechanism of energy storage will restore its initial configuration and at the same time release the stored energy. As the spring restores, the volume of the viscous material will expand, which will suck the viscous material into the gun. Thereby, dripping is prevented. The predetermined d value controlling the amount of stored potential energy is caused by a displacement limiting axle, which is literally the length of the limiting axle minus the thickness of its inner gear at the front end and minus the initial length of the driving nut and the torsional spring.

To achieve the basic function of the present invention, a device for pumping a viscous material is required. It has a transmission module capable of storing and releasing energy; further, it can store a predetermined portion of the driving energy into potential energy for later release soon after the pumping stops. Thereby, the deformation of the viscous material during the pumping will be compensated, and the amount of material to be ejected from the gun due to self expansion will be sucked back.

The viscous material can be sealant for filling up cracks between different components or grease for lubricating machine parts.

The present invention has the advantage of pumping and delivering viscous materials smoothly and continuously, without consuming too much manual power. Further, it can be equipped with a lighting unit, a smearing unit or a guiding unit.

Figure 1:
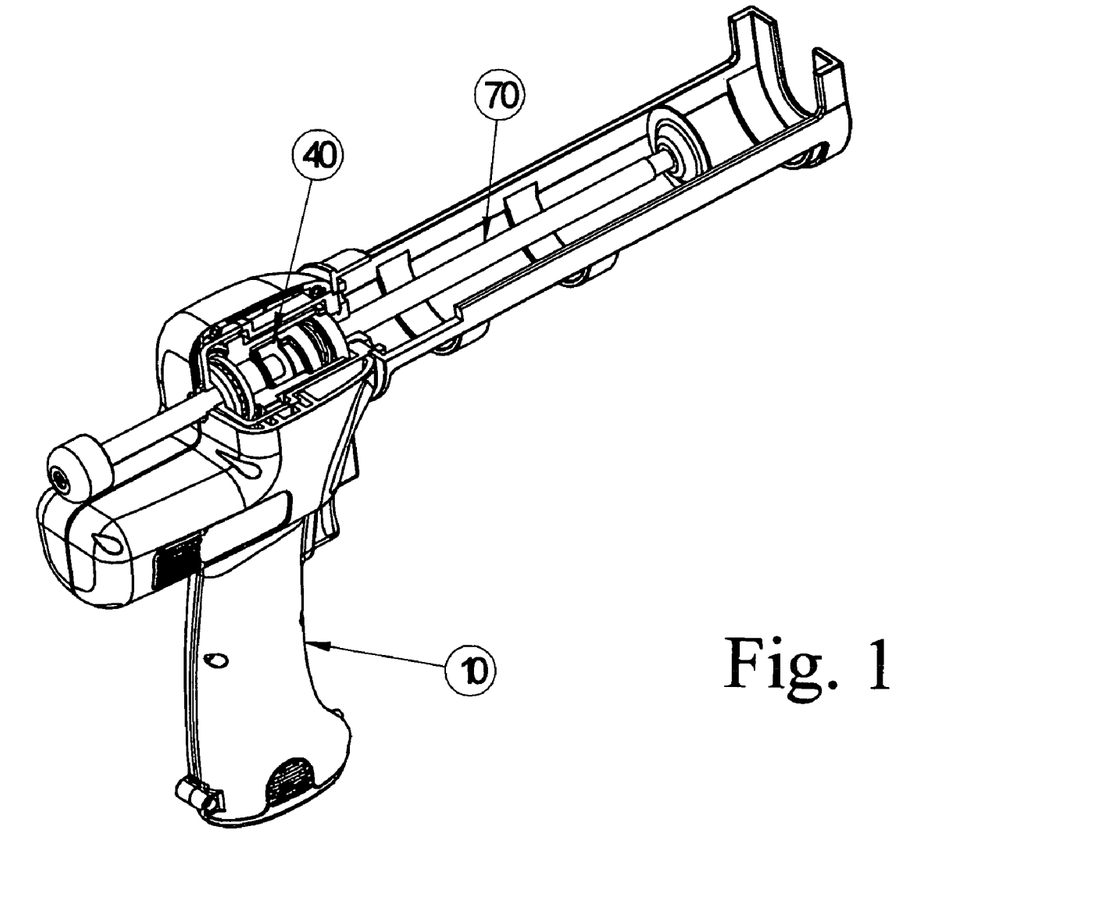
FIG. 1 is a perspective cross-sectional view of a device for pumping viscous materials of the present invention.

FIG. 1 shows the device that can prevent the dripping caused by pumping of sealant or grease, which comprises a main body with a set of bracket and handle 10, a driving and energy storing/releasing unit 40. The driving and energy storing/releasing unit 40 consists of an actuator 42, a module for releasing and storing energy 44 and a pumping mechanism 70.

Figure 2:
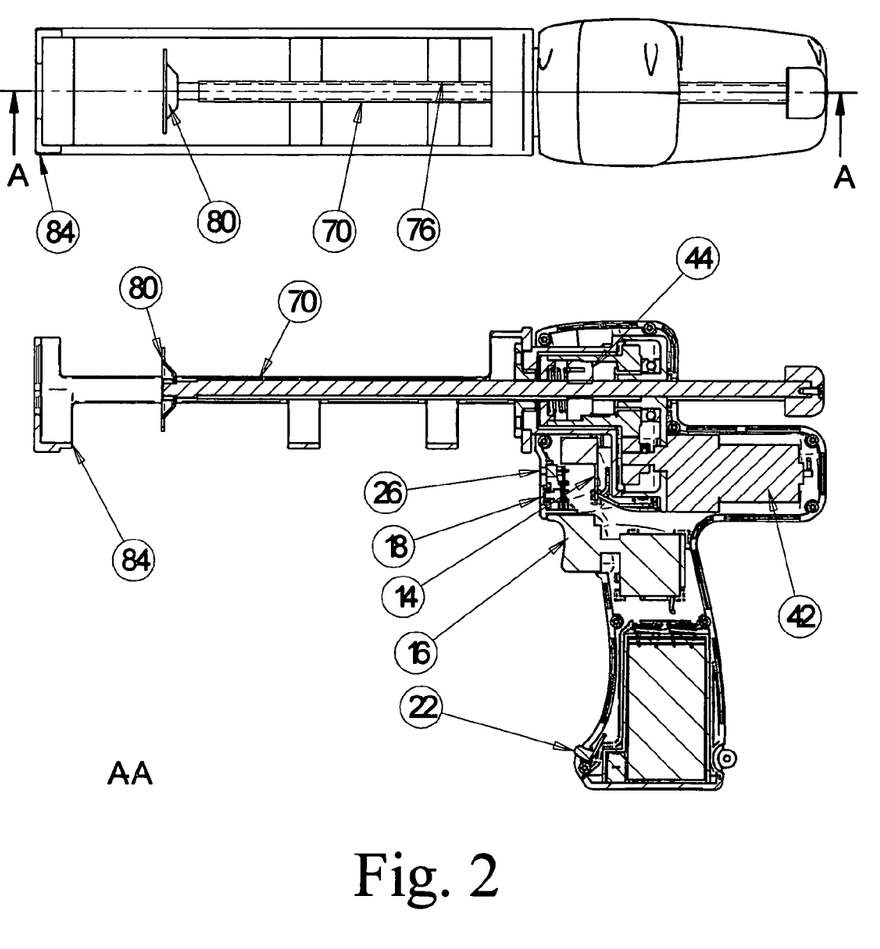
FIG. 2 is a side cross-sectional view of the device for pumping viscous materials in FIG. 1.
Figure 3:
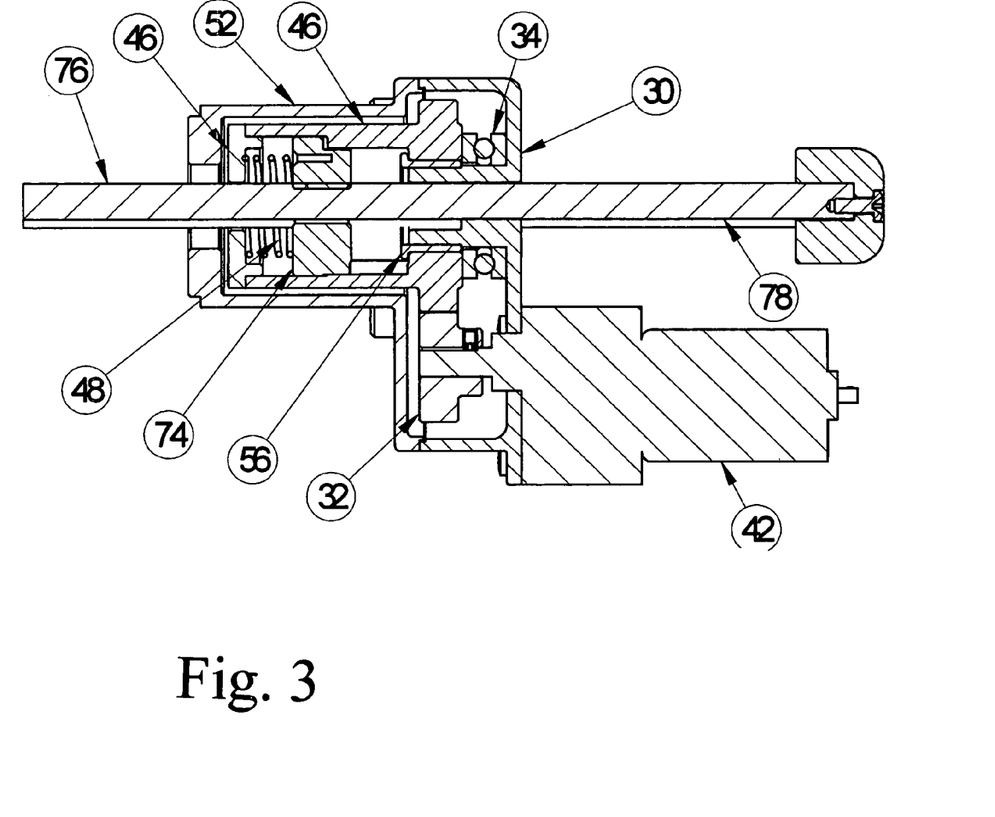
FIG. 3 is a cross-sectional view of an energy storage/release unit of the present invention.
Figure 4:
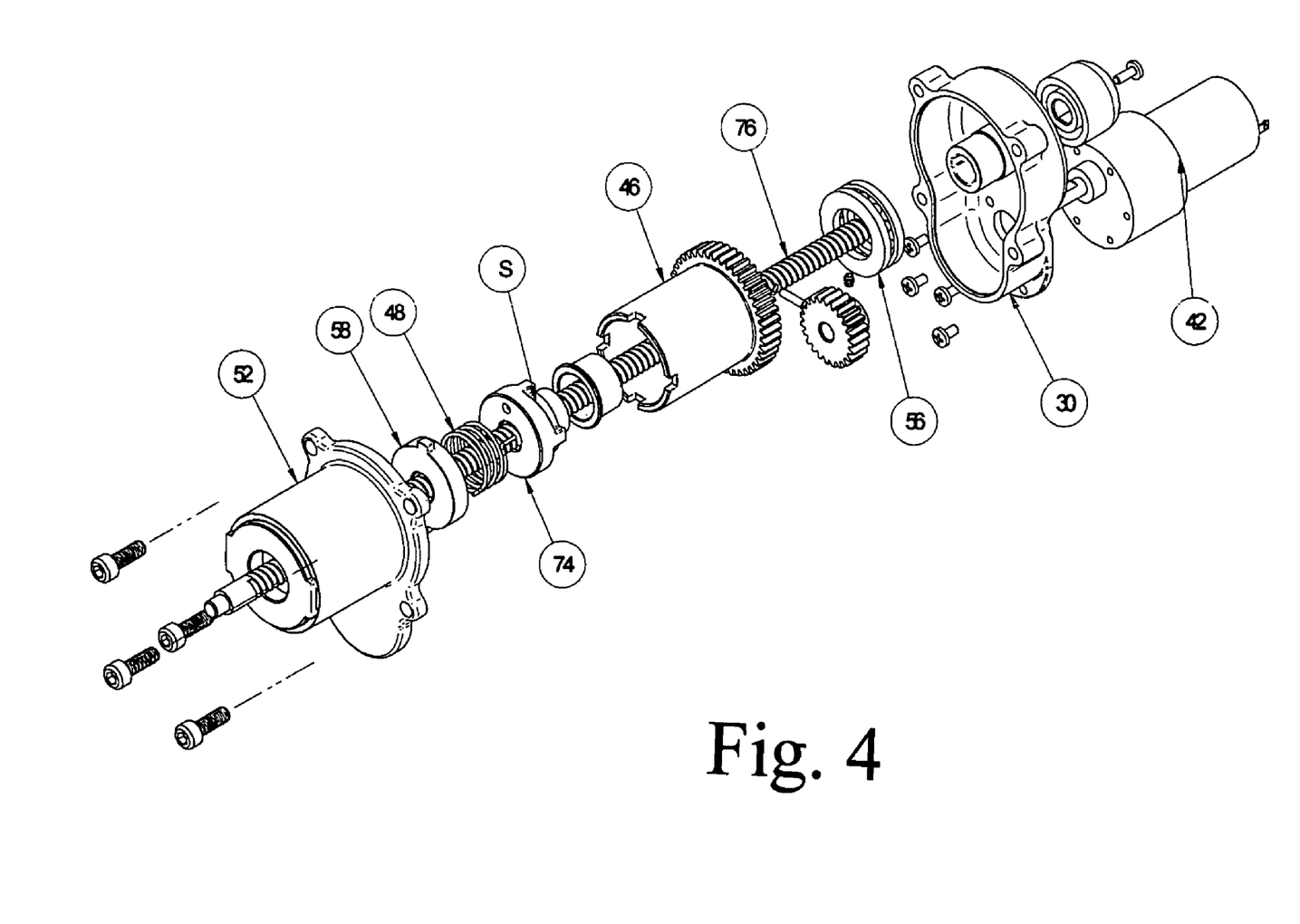
FIG. 4 is an exploded perspective view of the energy storage/release unit in FIG. 3.
Figure 5:
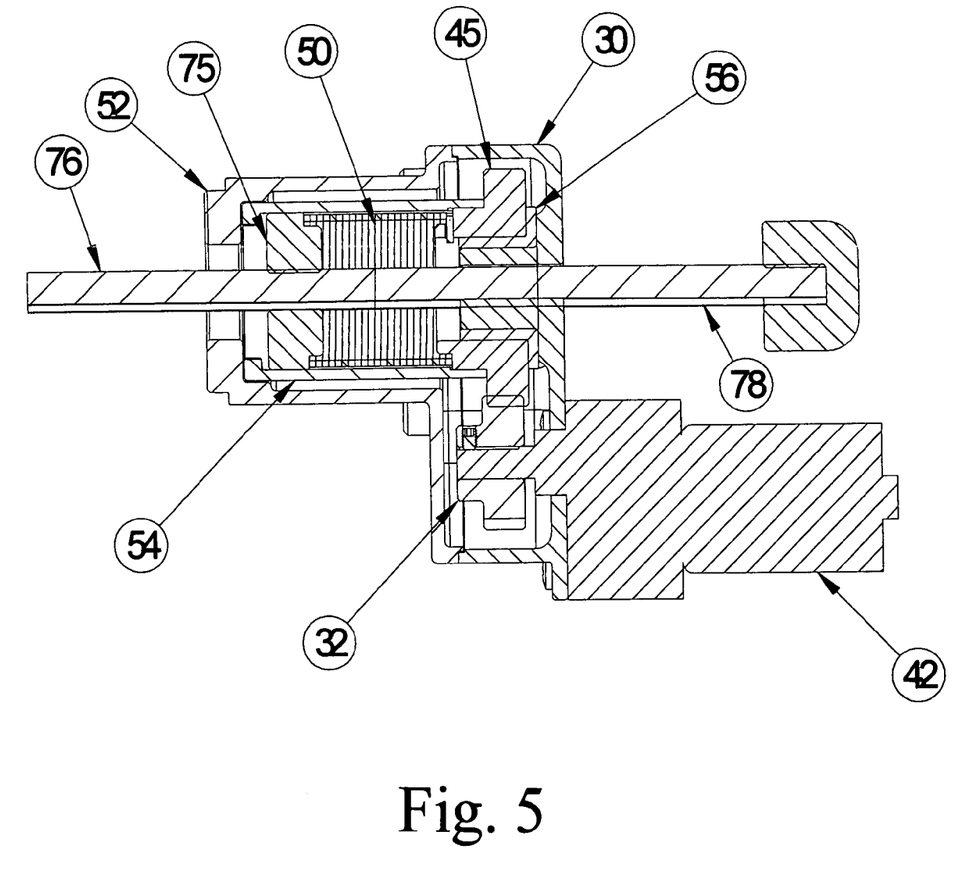
FIG. 5 is a cross-sectional view of another preferred embodiment of an energy storage/release unit of the present invention.

FIGS. 2, 3 and 4 show that the driving switch 16 activates the actuator 42, so that the gear wheel 32 of the driving and energy storing/releasing unit 40 can drive the driving shaft 46 to rotate. The driving shaft 46 is mounted on the oiled bearing 56, and the torsional spring 50 will rotate accordingly, because an end of the spring 50 is inserted in a terminal hole 51 on the shaft 46. Another end of the spring 50 is inserted into the driving nut 74. Thereby, the torsional spring 50 will be stretched, pushing the piston 80 of the pumping mechanism 70 for a predetermined displacement Δl. After when, the actual pumping starts. The twisting of the torsional spring 50 stores an amount of potential energy. The outer teeth 67 of the driving nut 74 and the inner teeth 55 of the shift limiting axle will be coupled and the driving shaft 46 will drive the driving nut 75 directly. The potential energy stops to accumulate. The torsional spring 50 is restored when a pumping action stops, whereby the driving shaft 46 will be drawn backward for a linear distance d, expanding the room for the viscous material left in the device of pumping and therefore preventing dripping.

Referring to FIGS. 5 to 8, another preferred embodiment of the present invention using a torsional spring 50 to store potential energy is illustrated.

Figure 6:
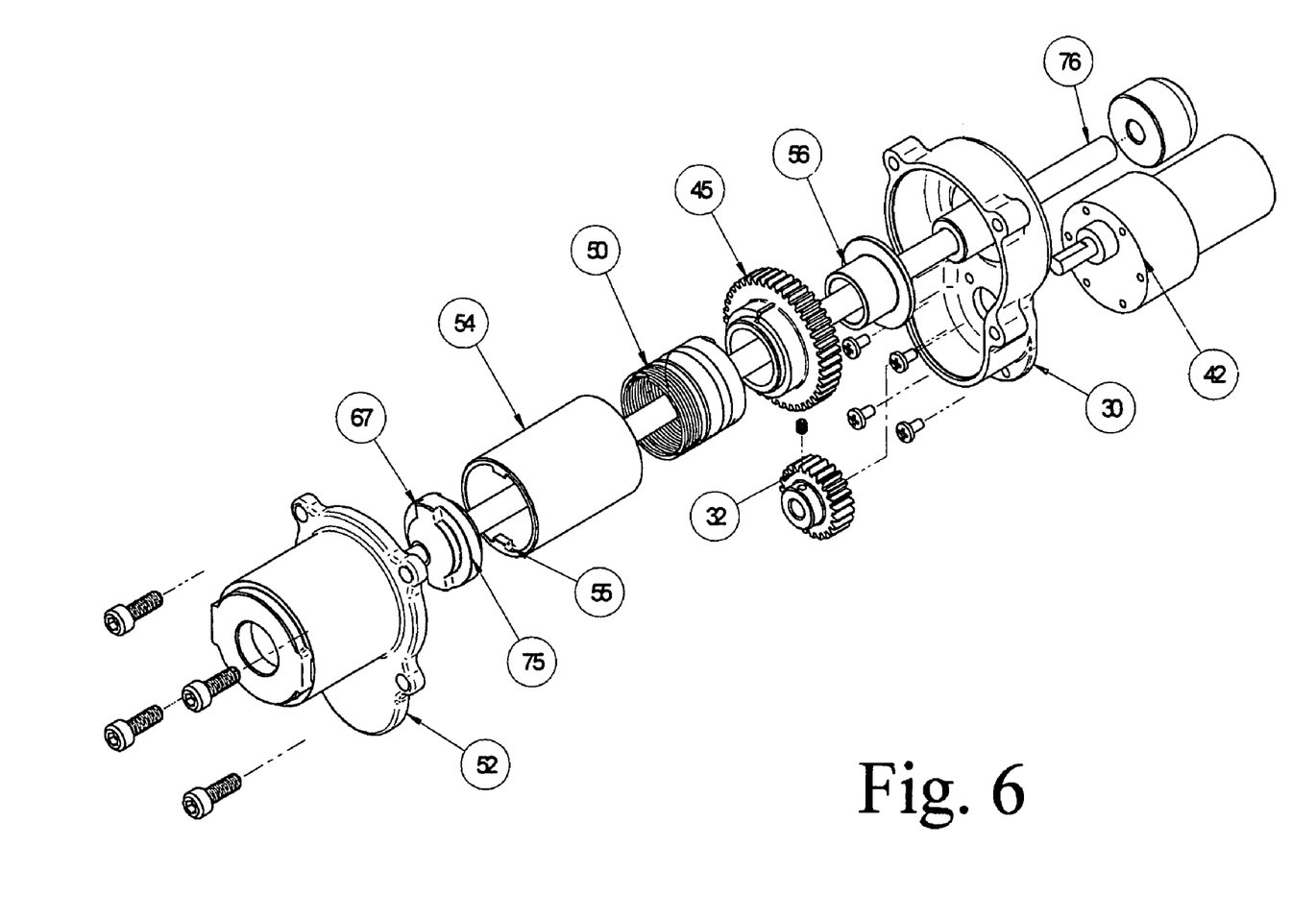
FIG. 6 is an exploded perspective view of another preferred embodiment of the energy storage/release unit in FIG. 5.

In FIG. 6, the various components in the driving and energy storing/releasing unit 40 will work accordingly. The driving switch 16 activates the actuator 42, so that the gear wheel 32 of the driving and energy storing/releasing unit 40 can drive the driving shaft 45 to rotate. The driving shaft 45 is mounted on the oiled bearing 56, and the torsional spring 50 will rotate accordingly, because an end of the spring 50 is inserted in a terminal hole 51 on the shaft 45. Another end of the spring 50 is inserted into the driving nut 75. Thereby, the torsional spring 50 will be stretched, pushing the piston 80 of the pumping mechanism 70 for a predetermined displacement Δl. After when, the actual pumping starts. The twisting of the torsional spring 50 stores an amount of potential energy. The outer teeth 67 of the driving nut 75 and the inner teeth 55 of the shift limiting axle will be coupled and the driving shaft 45 will drive the driving nut 75 directly. The potential energy stops to accumulate. The torsional spring 50 is restored when a pumping action stops, whereby the driving shaft 45 will be drawn backward for a linear distance d, expanding the room for the viscous material left in the device of pumping and therefore preventing dripping.

When the operator decides to stop pumping, he or she operates the driving switch 16 so as to stop the actuator gear wheel 32 and the driving shaft 45, and therefore the torsional torque ceases. The potential energy stored in the previously stretched and twisted transmission torsional spring 50 will release, whereby the driving nut 75 will be driven backward by the torsional spring 50 for a distance d to the initial position. This linear shift will cause the piston on the push rod 80 moving backward, whereby the room for the viscous material left in the pumping device will expand and therefore preventing dripping.

Figure 7:
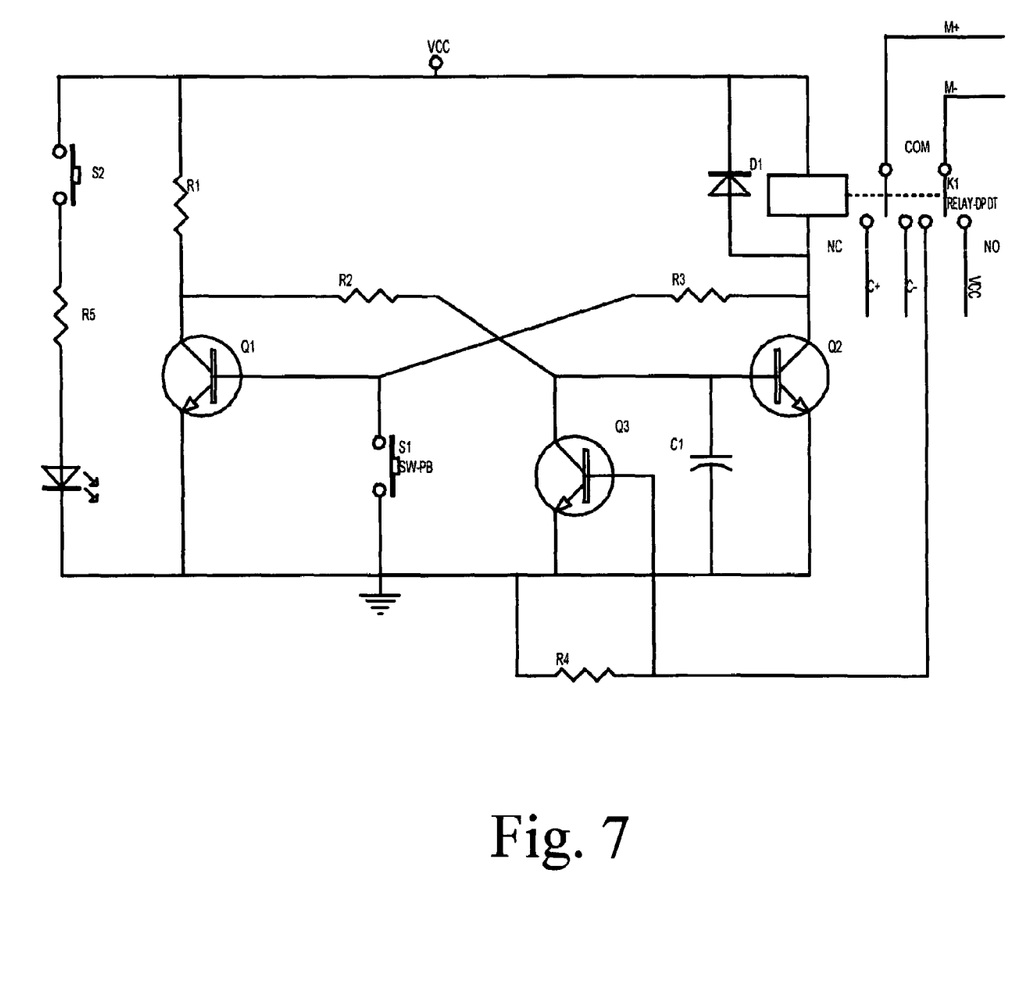
FIG. 7 is the circuit diagram of the feedback circuit of the present invention.

Referring to FIG. 7, when the viscous material is used up, the operator pushes a recoil switch 18, whereby three NPN transistors Q1, Q2 and Q3 and a DPDT-Relay in the control circuit board 13 will provided the actuator 42 with a reverse electric current for returning the pumping device 70 to an original configuration. The current in the actuator 42 will increase till a preset maximum value is attained, stopping the actuator 42.

Figure 8:
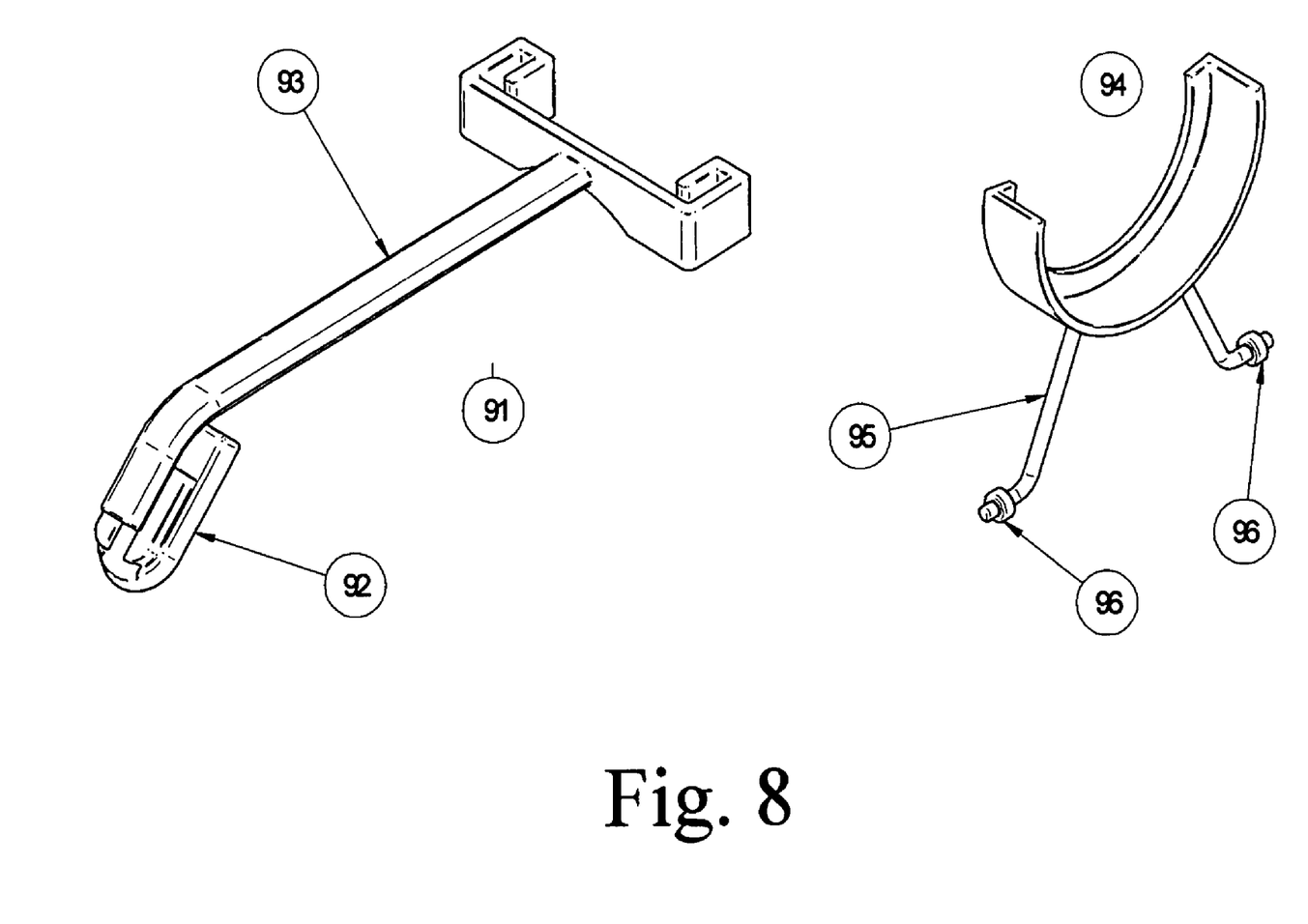
FIG. 8 is a perspective view of the smearing and the guide elements of the present invention.
Figure 9:
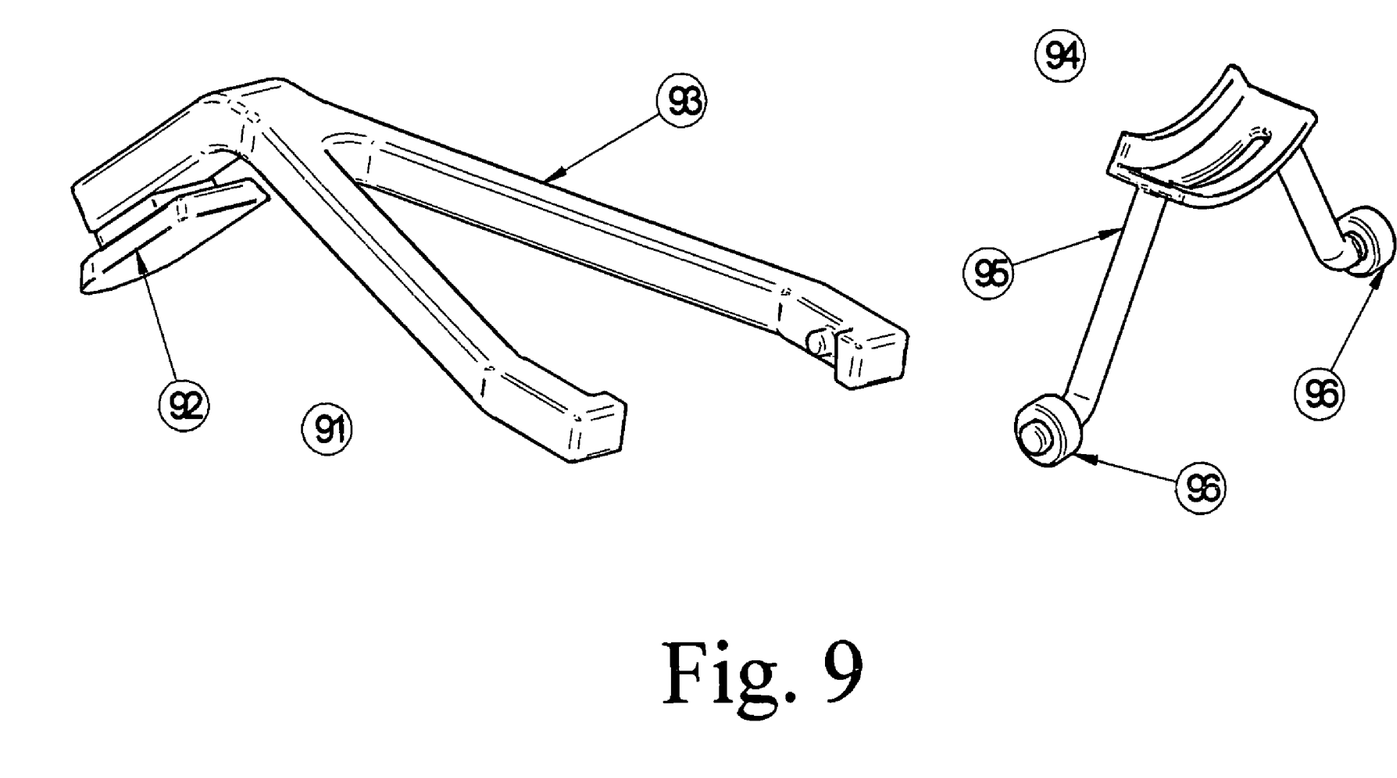
FIG. 9 is a perspective view of another preferred embodiment of the smearing and the guide elements of the present invention.
Figure 10:
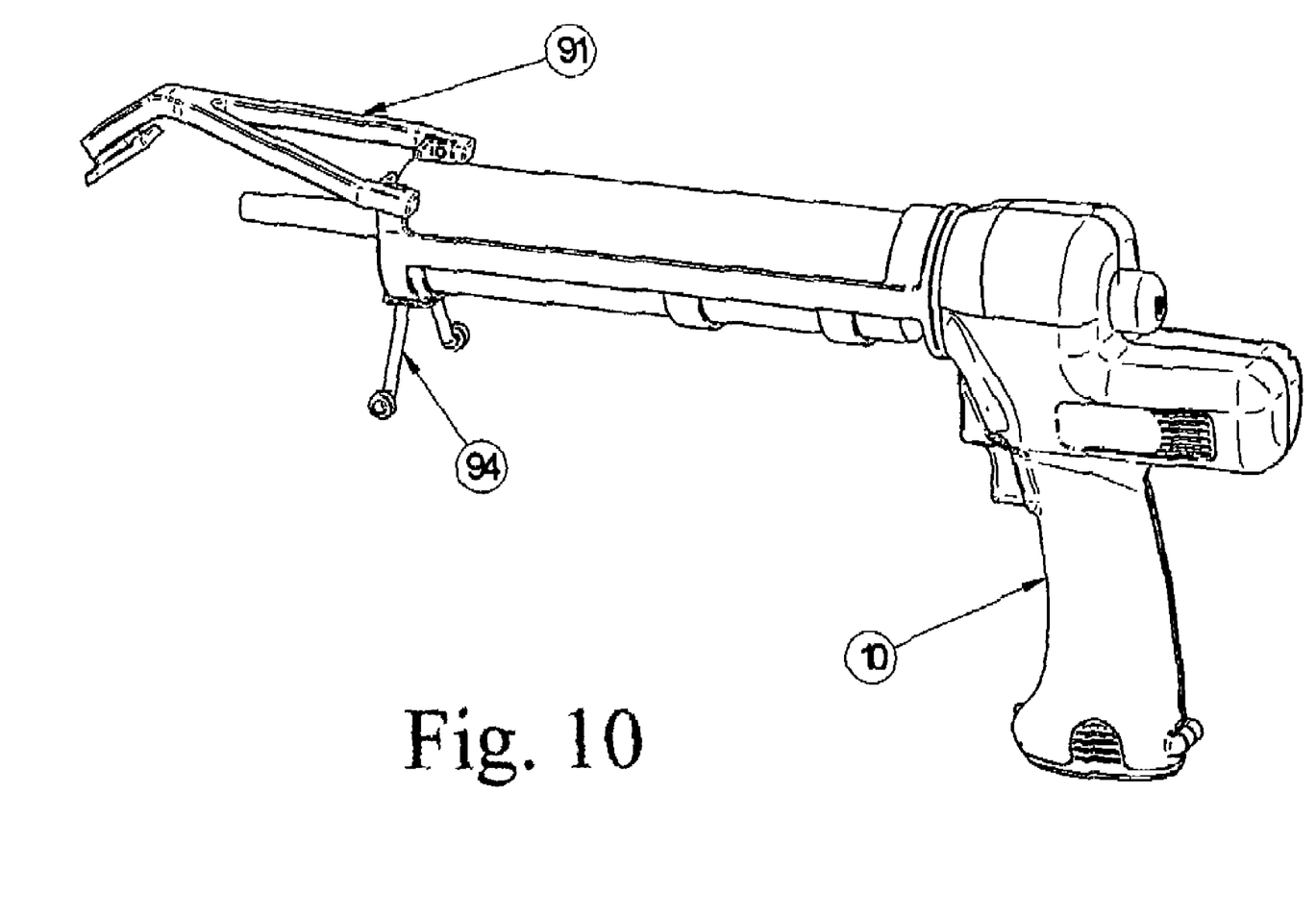
FIG. 10 shows the smearing and the guide elements installed on a device for pumping viscous materials of the present invention.

FIGS. 8, 9 and 10 elaborate the smearing/guiding unit 90, which consists of a smearing piece 91, having a blade 92 and a rod 93, and a guiding piece 94, having a bracket 95 and a rolling wheel 96. The unit 90 reduces the fatigue of an operator.

The present invention is thus described, and it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method of pumping viscous materials, comprising the steps of:

(1) storing a predetermined portion of driving energy for a pumping operation as elastic potential energy when said pumping operation starts; and (2) releasing said driving energy stored in step (1) when said pumping operation stops, leaving a space for filling viscous materials as said viscous materials expand after the pumping operation is terminated, whereby said viscous materials will be sucked back into an associated pumping device for preventing dripping of said viscous materials; and wherein said step of storing elastic potential energy is realized by a declined surface structure, selected from a slope and a spring, formed on a screw nut at a free end of a push rod in said pumping device, thereby a driving torque doing work to deform said spring when said pumping operation starts so as to shift said push rod for a predetermined displacement determined by a height of said slope, when said elastic potential energy is stopped to be stored and said push rod is driven directly; said spring is restored when the pumping operation stops, whereby said push rod will be drawn backward through a distance to expand with the space for filling said viscous materials left in said pumping device and therefore preventing dripping.

2. A method of pumping viscous materials, comprising the steps of:

(1) storing a predetermined portion of driving energy for a pumping operation as elastic potential energy when said pumping operation starts; and (2) releasing said driving energy stored in step (1) when said pumping operation stops, leaving a space for filling viscous materials as said viscous materials expand after the pumping operation is terminated, whereby said viscous materials will be sucked back into an associated pumping device for preventing dripping of said viscous materials; and wherein said step of storing elastic potential energy is realized by a torsional spring coupled with a shift limiting mechanism formed on a screw nut at a free end of a push rod in said pumping device, thereby a driving torque doing work to deform said spring when said pumping starts so as to shift said push rod for a predetermined displacement of said push rod, after when said elastic potential energy is stopped to be stored and said push rod is driven directly; said spring being restored when a pumping action stops, whereby said push rod will be drawn backward for a same linear distance, expanding the space for filling said viscous material left in said pumping device and therefore preventing dripping.

3. A device for pumping viscous materials, comprising:
a main body comprising a bracket and a handle;
a driving unit with energy storing/releasing function comprising an actuator and a module for energy storing/releasing; and
a pumping unit comprising a push rod, a driving screw nut and a piston;
whereby a predetermined portion of driving energy will be stored for a pumping operation as elastic potential energy when said pumping operation starts, whereby said driving energy stored will be released when said pumping operation stops, and whereby said viscous materials are sucked back into an associated pumping device for preventing dripping of said viscous materials; and wherein said module for energy storing/releasing in said driving unit with energy storing/releasing function further comprises a driving shaft with inner gear teeth, a compressive torsional spring and a driving nut with outer gear teeth and a slope; said driving shaft being driven by said actuator so as to twist said torsional spring and cause a linear and an angular displacements on said driving nut, whereby an initial driving energy will be transformed into potential energy until a displacement of said outer gear teeth on said driving nut exceeds a predetermined height of said slope, when said outer teeth and said inner teeth is coupled and said driving shaft drives said driving nut directly, said elastic potential energy is stopped to be accumulated; said torsional spring being restored when a pumping action stops, whereby said driving shaft will be drawn backward through a distance, expanding a space for receiving said viscous materials left in said pumping unit and therefore preventing dripping of said viscous materials.

4. The device for pumping viscous materials of claim 3 wherein said bracket and said handle are provided with a recoiling switch for activating a reverse electric current through said actuator for returning said device for pumping to an original configuration; said current in said actuator increasing till a preset maximum value is attained, stopping said actuator and restarting said pumping action.

5. The device for pumping viscous materials of claim 3 further comprising an accessory unit having a lighting piece, a smearing piece and a guiding piece independently mounted on said device for pumping said viscous materials; said lighting piece further including a light bulb mounted at a front end of said bracket and said handle and a light switch controlling said light bulb; said smearing piece further including an exchangeable blade which is selected from a planar surface, an arced surface and a rectangular surface and a rod for holding said blade, whereby smearing said viscous materials on an object that is ejected from said device; said guiding piece further including a front bracket and a rolling wheel.

6. The device for pumping viscous materials of claim 3 wherein said light switch further comprises a light sensor and a control circuit board capable of automatically turning on said light bulb under low background luminosity, whereby an operator will see a work object clearly.

7. The device for pumping viscous materials of claim 3 wherein said guiding unit is mounted on a front end of said pumping unit for pumping said viscous materials for directing said viscous materials in a predetermined direction and capable of adjusting an inclination angle between said guiding unit and said device for pumping said viscous materials; said guiding unit further including an actuator facilitating automatic delivery of said viscous materials, and reducing fatigue of an operator.

* * * * *